June 28, 1966
E. E. CROSBY
3,258,287
HOLDING HOOK FOR HOLLOW WORK STOCK
Filed March 12, 1965
2 Sheets-Sheet 2
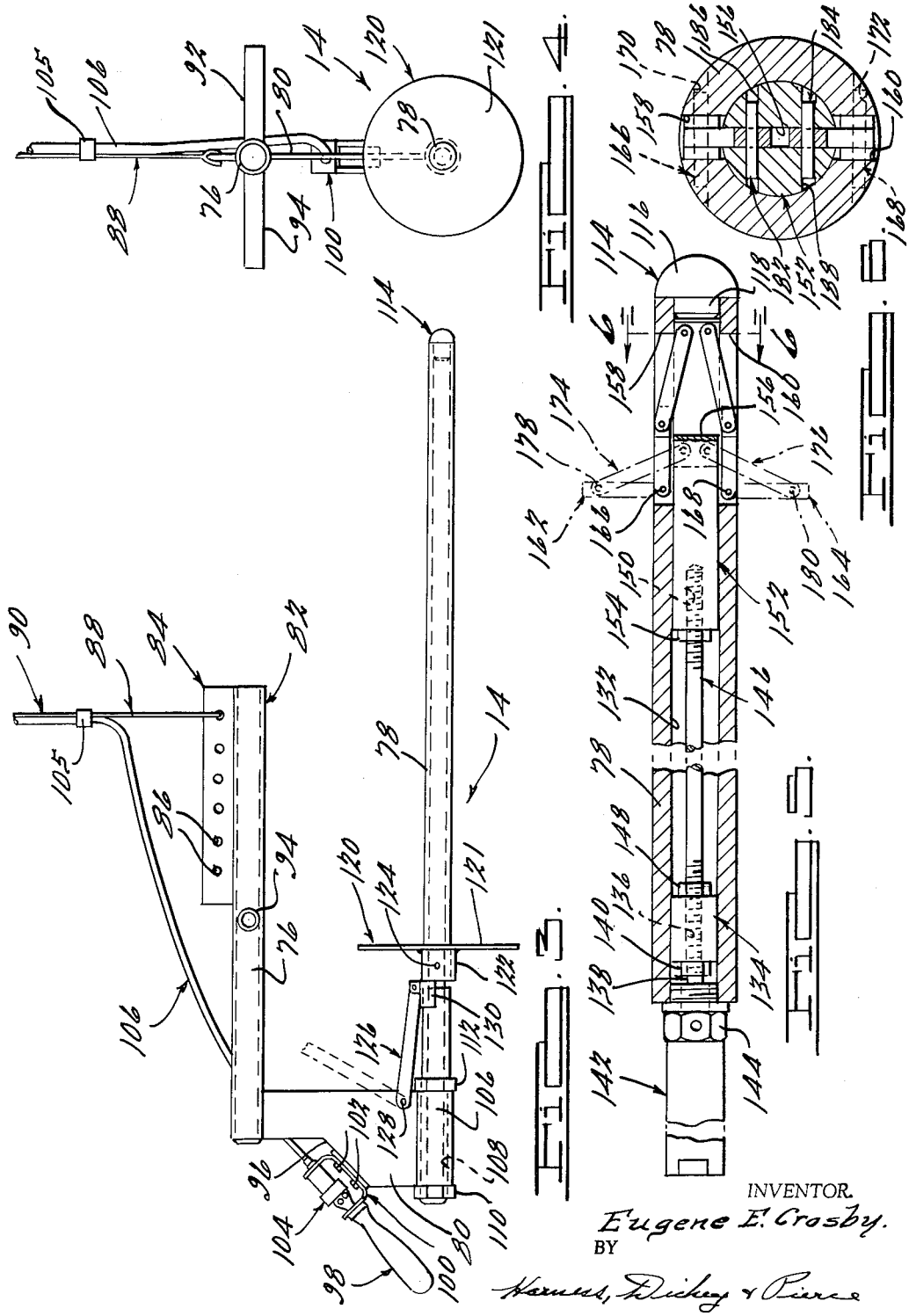
INVENTOR.
Eugene E. Crosby.
BY
Harness, Dickey & Pierce
ATTORNEYS.

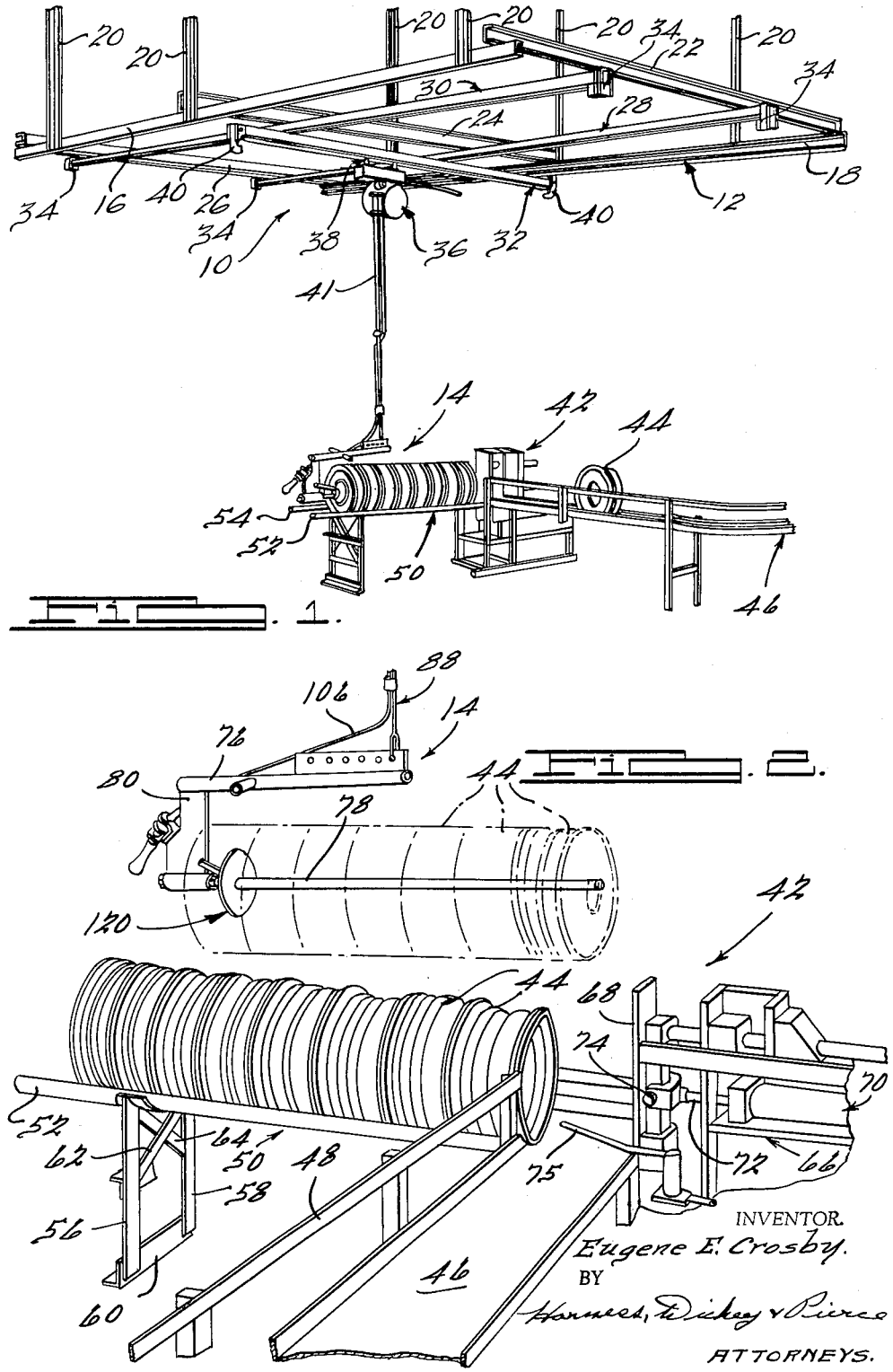

United States Patent Office 3,258,287
Patented June 28, 1966

3,258,287
HOLDING HOOK FOR HOLLOW WORK STOCK
Eugene E. Crosby, Plymouth, Mich., assignor to Kelsey-Hayes Company, Romulus, Mich., a corporation of Delaware
Filed Mar. 12, 1965, Ser. No. 439,293
6 Claims. (Cl. 294—67)

This invention relates generally to work transporting or conveying apparatus and, more particularly, to a new and improved apparatus for stacking or unstacking work stock such as vehicle wheels or the like.

It is a general object of the present invention to provide a new and improved apparatus for stacking or unstacking work stock such as automotive and truck vehicle wheels in which the operator exerts a minimum amount of effort.

It is a more particular object of the present invention to provide a new and improved apparatus of the above character which facilitates handling the wheels or the like through the provision of a novel palletizing hook mechanism.

It is another object of the present invention to provide a new and improved apparatus of the above character wherein the hook mechanism is provided with means for selectively retaining the wheels or the like thereon.

It is still another object of the present invention to provide an apparatus of the above character which includes a novel overhead structure permitting convenient and effortless movement of the aforesaid hook mechanism and load of wheels or the like supported thereon.

It is a further object of the present invention to provide a new and improved apparatus for stacking and unstacking work stock such as vehicle wheels or the like which is of an extremely simple design, easy to assemble and economical to commercially produce.

Other related objects and advantages of the present invention are achieved through the provision of a novel apparatus for stacking and unstacking work stock such as automobile and truck vehicle wheels that generally comprises an overhead support structure upon which a wheel engaging or palletizing hook mechanism is movably supported. A pneumatic balancing device is provided for elevating or lifting a plurality of wheels or the like upon the aforesaid hook mechanism whereby the operator can manipulate the load of wheels between two or more work stations or stack and unstack the wheels from associated pallet racks, trucks or the like, with a minimum expenditure of time and effort.

A more complete understanding of the present invention and other objects and features thereof will be obtained from the following detained description taken in conjunction with the accompanying drawings, wherein:

FIGURE 1 is an elevated perspective view of the apparatus of the present invention;

FIGURE 2 is an enlarged elevated perspective view of the apparatus of the present invention, as shown in operative association with a structure for supplying work stock such as vehicle wheels or the like;

FIGURE 3 is an enlarged side elevational view of the work stock palletizing hook mechanism incorporated in the present invention;

FIGURE 4 is an end elevational view of the hook mechanism illustrated in FIGURE 3;

FIGURE 5 is a side elevational view, partially broken away, of an alternate embodiment of the palletizing hook mechanism incorporated in the apparatus of the present invention; and FIGURE 6 is an enlarged transverse cross-sectional view taken along the line 6—6 of FIGURE 5.

Referring now to FIGURES 1 and 2 of the drawings, an apparatus for stacking and unstacking vehicle wheels or the like, generally designated by the numeral 10 and constructed in accordance with an exemplary embodiment of the present invention, is shown as generally comprising an overhead support structure and carriage assembly 12, and a palletizing hook mechanism 14 which is supported below and is movable within a predetermined area defined by the assembly 12. As illustrated in FIGURE 1, the carriage assembly 12 comprises a pair of spaced parallel and longitudinally extending channels or beams 16 and 18 which are adapted to be supported by means of a plurality of vertically extending support members, generally designated 20, that depend downwardly from and are rigidly secured to the roof or the like of the building within which the apparatus 10 is located. Extending transversely between the longitudinal rails 16 and 18 is a plurality of transverse beams 22, 24 and 26, these beams being welded or similarly secured to the tops of the longitudinal rails 16 and 18, as seen in FIGURE 1. Mounted on the lower sides of the transverse beams 22, 24, and 26 is a pair of spaced parallel and longitudinally extending carriage rails 28 and 30 which are preferably C-shaped in cross section and are welded or similarly secured to the lower sides of the beams 22, 24, and 26. The carriage rails 28 and 30 are adapted to support a transversely extending, C-shaped carriage rail 32 for longitudinal movement in a direction parallel to the rails 28 and 30. Such longitudinal movement of the carriage rail 32 is preferably provided by suitable roller mechanisms (not shown) which are secured to the top of the carriage rail 32 inwardly from the opposite ends thereof and are rotatable within longitudinally extending channels defined by the rails 28 and 30. Suitable stop members, generally designated 34, are mounted on each end of the carriage rails 28 and 30 to limit the longitudinal movement of the transverse rail 32.

The palletizing hook mechanism 14 is supported upon the carriage assembly 12 by means of a lift device, generally designated by the numeral 36, whose construction and operation will later be described, and which is movably secured to the transversely extending carriage rail 32 by means of a roller or trolley assembly 38. The trolley 38, and hence the lift device 36 which is secured thereto, is adapted to move or slide axially of the carriage rail 32 independent of the longitudinal movement of the rail 32 along the carriage rails 28 and 30, suitable end stops 40 being provided on the opposite ends of the rail 32 to limit the transverse movement of the lift device 36 and trolley 38 along the rail 32. From the structure above described, it will be seen that the lift device 36, and hence the palletizing hook mechanism 14 which is connected thereto, is laterally movable within an area defined by the transverse distance between the longitudinal carriage rails 28 and 30 and the longitudinal distance between the opposite ends of the rails 28 and 30. Accordingly, the hook mechanism 14 may be used to manipulate vehicle wheels or the like anywhere within the lateral area defined by the rails 28 and 30, as will be described.

It will be noted that the lift device 36 may be of any one of a number of well known types of elevating or hoist mechanisms which is of a construction strong enough to accommodate lifting the hook mechanism 14 when is is fully loaded; however, one preferable construction of the device 36 is a pneumatically energized load balancing mechanism distributed under the trade name of "Equi-Air" by the D. W. Zimmerman Manufacturing Company. In this construction of the device 36, pressurized air is utilized to counterbalance the load placed on the lifting device's elevating cable, herein designated by the numeral 41, such that the palletizing hook mechanism 14 is continually and automatically in a state of weightless balance, regardless of the position thereof, and thus the hook mechanism 14 may be lifted or lowered by the slightest pressure exerted thereon by the operator.

As seen in FIGURES 1 and 2, the apparatus 10 of the present invention is shown in operative association with a work stock supplying or conveying structure, generally designated 42, the particular work stock illustrated herein being automotive or truck vehicle with wheels, representatively designated by the numeral 44. The structure 42 comprises a conveying line 46 along which the wheels 44 are conveyed subsequent to final assembly thereof, a rail 48 being provided along one side of the conveying line 46 to guide the wheels 44 transported therealong. The line 46 terminates at a loading platform 50 which comprises a pair of elongated spaced parallel rods 52 and 54 between which a plurality of coaxially aligned wheels 44 may be supported or cradled. The rods 52 and 54 are supported at one end upon a suitable support structure comprising vertically extending legs 56 and 58 and reinforcing cross members 60, 62 and 64. The opposite ends of the rods 52 and 54 abut against a wheel pusher mechanism 66 which includes a wheel engaging pusher member 68 that is adapted to be reciprocated along a path parallel to the rods 52 and 54 by means of a piston and cylinder assembly 70 which comprises a piston rod 72 that is connected at one end to the rear side of the member 68, as seen at 74. A suitable tripping or actuating arm 75 extends across the end of the conveying line 46 and is adapted to be engaged by the wheels 44 as they are transported along the line 46, whereby the assembly 70 is energized, resulting in the pusher member 68 moving toward the outer ends of the rods 52 and 54. As the member 68 thus moves, the wheels 44 cradled between the rods 52 and 54 will be abutted against one another and be biased longitudinally outward toward the ends of the rods 52 and 54 and thus be properly positioned for engagement by the palletizing hook mechanism 14 of the present invention, as will later be described.

Referring now in detail to the construction of the hook mechanism 14 of the present invention, as best seen in FIGURE 3, the mechanism 14 is generally C-shaped in side elevational view and comprises an upper horizontally extending support section 76, a lower horizontally extending wheel engaging section or mandrel 78 and a handle mounting section 80 which extends between the left ends of the sections 76 and 78. The support section 76 comprises a hollow cylindrical tubular member 82 which has an elongated mounting plate 84 mounted on the top of the right end thereof, the plate 84 being welded or similarly rigidly secured to the tubular member 82. The plate 84 is formed with a plurality of hook engaging apertures, generally designated 86, one of which is adapted to be engaged by support hook or bracket 88 that is secured to the lower end of the elevating cable 41 of the lift device 36. It may be noted that the longitudinal positions of the apertures 86 in the plate 84 correspond with the center of gravity of the entire palletizing hook mechanism 14 when various numbers of wheels 44 or the like are supported thereon, thereby enabling the hook 88 to be engaged with the particular aperture 86 corresponding to a predetermined number of wheels 44 that are to be transported on the hook mechanism 14 so that vertical and horizontal stabilization may be effortlessly maintained during movement of the loaded mechanism 14. The tubular member 82 is provided with a pair of outwardly extending guide handles 92 and 94 which are secured as by welding to the opposite sides of a medial portion of the member 82. The handles 92 and 94 may be provided with suitable means to facilitate manual gripping thereof, for example, bicycle handle bar grips or the like.

The left end of the tubular member 82 is secured to the upper end of the handle mounting section 80 which comprises a substantially flat plate that has the upper rear section thereof cut away to define a handle supporting surface 96. A manipulating handle 98 is supported upon the surface 96 by means of a generally U-shaped mounting bracket 100 that is secured to the section 80 by means of suitable bolts 102. The mounting bracket 100 also serves to support a control switch or valve 104 which is communicable through a pneumatic conduit 106 with the lift device 36 and is adapted to be selectively adjusted in accordance with the particular load conditions imposed upon the lift device 36 so that the hook mechanism 14 is continuously in a state of weightless balance regardless of the number of wheels 44 supported thereon. The lower end of the conduit 106 may be secured to the elevating cable 41 by suitable clips 105, as seen in FIGURE 3.

The lower end of the handle support section 80 is welded or similarly secured to an annular sleeve or collar 106 that defines a central bore 108 through which the left end of the wheel engaging mandrel 78 extends. The mandrel 78 comprises a hollow elongated cylinder which is preferably slightly smaller in diameter than the bore 108 and hence may be easily inserted therewithin. The left end of the mandrel 78 is externally threaded and is provided with a pair of retaining nuts 110 and 112 which are adapted to be tightened into engagement with the opposite ends of the sleeve 106 whereby to rigidly secure the left end of the mandrel 78 within the sleeve 106. The opposite (right) end of the cylindrical mandrel 78 is closed by a plug member 114 which comprises a hemispherically shaped outer end section 116 and a cylindrical inner end section 118 which may be threaded or press fitted within the end of the mandrel 78.

Means for limiting the number of wheels 44 which may be supported on the mandrel 78 is provided by an adapter 120 which is shown in FIGURES 3 and 4 and comprises a flat annular plate 121 that is formed with a central opening and extends radially outwardly from the mandrel 78. The plate 121 is welded to one end of a securing collar 122 which has an inner diameter that is slightly larger than the outer diameter of the mandrel 78, whereby the plate 121 and collar 122 are axially slidable along the mandrel 78. The collar 122 may be provided with a suitable set screw or the like 124 for rigidly securing the adapter 120 at a preseleted position along the mandrel 78.

As best seen in FIGURE 3, the hook mechanism 14 is provided with a positioning arm, herein designated 126, that is pivotable to and from a position extending substantially parallel to the longitudinal axis of the mandrel 78 and which is thus adapted to position the adapter 120 at a preselected axial position along the mandrel 78. More particularly, the arm 126 is adapted to position the adapter 120 along the mandrel 78 such that the total capacity or number of wheels which may be supported on the mandrel 78 is decreased by one or more, depending upon the actual length of the arm 126. As seen in FIGURE 3, the arm 126 is pivotably secured to the right side of the handle mounting section 80 by a suitable pivot pin, bolt or the like 128, the opposite (right) end of the arm 126 being provided with a semi-circular, channel-shaped member 130 which is adapted to contiguously engage the top of the mandrel 78 when the arm 126 is biased to the position illustrated by the solid lines in FIGURE 3. It will be noted that the arm 126 may be pivoted to an upwardly or vertically extended position, as indicated by the phantom lines in FIGURE 3, so as to not interfere with loading or unloading the wheels 44 onto or off from the mandrel 78 when the adapter 120 is not being used.

Referring now to FIGURES 5 and 6, in a slightly modified construction of the palletizing hook mechanism 14 incorporated in the present invention, the mandrel 78 is formed with a central, axially extending bore 132 within which a cylindrical piston 134 is reciprocally mounted. The piston 134 is formed with a central internally threaded bore 136 within which the right end of a piston rod 138 that extends coaxially within the bore 132 is threadably mounted, a suitable locknut 140 being provided to rigidly secure the end of the piston rod 138 to the piston 136. The piston rod 138 is adapted to effect reciprocal movement of the piston 136 upon energization of a pneumatic cylinder assembly, generally designated 142, that extends axially from the left end of the bore 132 and is secured to the mandrel 78 by means of a suitable end fitting 144 which also serves to close the left end of the bore 132. The cylinder assembly 142 is adapted to be selectively actuated by means of a suitable valve, switch or the like (not shown) that is preferably mounted adjacent the control switch 104 on the handle support bracket 100, a suitable supply of pressurized air being communicated to the aforesaid switch and cylinder assembly 142 through an air conduit that may be coextensive with the aforedescribed conduit 106 and which is communicable with a suitable source of pressurized air as is commonly available in factories and the like. Extending coaxially of the bore 132 is another piston rod 146 which has its left end threadably engaged with the right end of the bore 136 of the piston 134, a locknut 148 being provided to fixedly secure the left end of the piston rod 146 and piston 134 together. The right end of the piston rod 146 is threadably secured within a central bore 150 formed in the left end of a cylindrical plunger member 152 that is reciprocably mounted within the right end of the bore 132, a locknut 154 being provided to secure the piston rod 146 and plunger member 152 together.

The right end of the plunger member 152 is formed with a rectangularly shaped, diametrically extending slot 156 which is aligned with a pair of diametrically opposed, rectangularly shaped openings 158 and 160 that are formed in the top and bottom, respectively, of the mandrel 78 adjacent the right end thereof. A pair of elongated wheel retaining arms 162 and 164 are pivotably mounted at their left ends within the left ends of the openings 158 and 160, respectively, by suitable pivot pins 166 and 168 which extend through spaced parallel bores 170 and 172, respectively, that are formed in the top and bottom of the mandrel 78 at positions intersecting the openings 158 and 160, as best seen in FIGURE 6. The arms 162 and 164 are adapted to be biased to and from a position extending radially outwardly from the top and bottom of the mandrel 78 by means of a pair of actuating links 174 and 176 that have their left ends pivotably connected by suitable bolts or the like 178 and 180 to the right or outermost ends of the arms 162 and 164, respectively. The opposite (right) ends of the actuating links 174 and 176 are pivotably connected within the central slot 156 of the plunger member 152 by means of a pair of cylindrical pivot pins 182 and 184 that extend through spaced parallel bores 186 and 188, respectively, which are formed in the top and bottom of the plunger member 152, as illustrated in FIGURE 6. It will be seen that as the plunger member 152 moves toward the left within the bore 132, resulting from actuation of the cylinder assembly 142, the retaining arms 162 and 164 will be pivoted to the position illustrated by the phantom lines in FIGURE 5, whereby the arms 162 and 164 will serve to prevent any of the wheels 44 that are supported upon the mandrel 78 from moving axially off the outer end thereof during manipulation of the hook mechanism 14. When the plunger member 152 moves to the right within the bore 132, resulting from deactuation of the cylinder assembly 142, the retaining arms 162 and 164 will be biased to the position illustrated by the solid lines in FIGURE 5, in which position the arms 162 and 164 are recessed below the outer periphery of the mandrel 78 and hence permit the wheels 44 or the like to move axially onto or off from the mandrel 78 for the purpose of loading or unloading the hook mechanism 14.

In a typical operation of the apparatus 10 of the present invention, the switch 104 is initially adjusted such that the palletizing hook mechanism 14 is balanced in an unloaded condition whereby the operator may effortlessly manipulate the mechanism 14 to the position where the wheels 44 or the like are to be loaded, for example, the loading platform 50. The adapter 120, if desired, may be initially positioned on the mandrel 78 to limit the number of wheels or the like to be transported on the hook mechanism 14. The mechanism 14 is then manipulated such that the mandrel 78 thereof is inserted within the annular cavity defined by the center of the plurality of coaxially aligned wheels 44 supported upon the rods 52 and 54 of the loading platform 50. If the embodiment of the mandrel 78 illustrated in FIGURES 5 and 6 is being used, the cylinder assembly 142 may be energized by actuation of the aforedescribed valve mechanism to bias the retaining arms 162 and 164 outwardly and thereby retain a predetermined number of wheels 44 on the mandrel 78. Thereafter, the switch device 104 may be adjusted such that the hook mechanism 14 is in a weightless balanced condition with the particular number of wheels 44 thereon, at which time the load of wheels 44 may be effortlessly conveyed from the loading platform 50 to any predetermined position, such as a new work station, pallet rack, truck or the like. It will be seen that the hook mechanism 14 and load of wheels 44 supported thereon may be biased longitudinally of the rails 28, 30 and longitudinally of the rail 32, thus enabling the hook mechanism 14 to convey the wheels 44 or the like to any desired position within the area defined between the rails 28 and 30.

Although particular reference has been made herein to use of the apparatus 10 of the present invention as applied to transporting automotive and truck vehicle wheels, it will be noted that the principles of the present invention are not intended to be limited to this sole application, since it will be apparent that the present invention is equally adapted for use in transporting virtually any type of work stock which may be accommodated by the palletizing hook mechanism 14, and it is to be understood that the claims appended hereto which are not specifically limited to an apparatus for transporting vehicle wheels are not to be construed as being limited to an apparatus for this sole application.

While it will be apparent that the preferred embodiments herein illustrated are well calculated to fulfill the objects above state, it will be appreciated that the apparatus of the present invention is susceptible to modification, variation and change without departing from the proper scope or fair meaning of the subjoined claims.

What is claimed is:
1. In a work stock transporting apparatus,
an overhead support structure,
a generally C-shaped work stock engaging hook mechanism comprising an elongated support section and a work stock engaging mandrel section,
means including cable means interconnecting said overhead support structure with said hook mechanism,
an adapter means axially movable along said mandrel section for limiting the quantity of work stock supported on said hook mechanism, and
means for position said means adapter along said mandrel section comprising arm means movably mounted on said hook mechanism and engageable with said adapter means.

2. In a work conveying apparatus,
a generally C-shaped work stock engaging hook mechanism comprising an upper support section, a mandrel section and an intermediate section connecting said support section and said mandrel section, and
means for retaining work stock on said hook mechanism comprising at least one retaining arm movably secured on one end of said mandrel section and means for pivoting said retaining arm to and from a position recessed within said mandrel section.

3. In a work conveying apparatus,
a generally C-shaped work stock engaging hook mechanism comprising a cylindrical work stock engaging mandrel section,
means for retaining work stock on said hook mechanism comprising a pair of retaining arms each of which has one end pivotably connected to said mandrel section, the opposite ends of each of said arms being pivotably connected to a plunger member movable relative to said mandrel section, and means for moving the said plunger member whereby said retaining arms are selectively biased from a position extending radially outwardly from said mandrel section to a position parallel to said mandrel section.

4. In an apparatus for conveying vehicle wheels or the like and including an overhead support structure, a generally C-shaped wheel palletizing hook mechanism, lift means for vertically moving said hook mechanism relative to said support structure, and trolley means for supporting said lift means on said support structure, the improvement wherein said hook mechanism comprises an elongated support section and an elongated tubular wheel engaging mandrel, handle means for manually controlling said hook mechanism, control means on said hook mechanism adjacent said handle means for selectively energizing said lift means, an adapter for limiting the number of wheels supported on said mandrel, means for selectively positioning said adapter on said mandrel comprising a positioning arm pivotably mounted on said hook mechanism, and engageable with said adapter, a pair of retaining arms pivotably mounted on one end of said mandrel, means for biasing said arms from a position extending outwardly from the outer periphery of said mandrel to a position recessed below the outer periphery of said mandrel, and control means for selectively energizing said last mentioned means.

5. The invention as set forth in claim 4 wherein said lift means includes means for pneumatically balancing said hook mechanism.

6. The invention as set forth in claim 4 wherein said means for biasing said retaining arms comprises a piston and cylinder assembly.

References Cited by the Examiner

UNITED STATES PATENTS

| | | | |
|---|---|---|---|
| 597,438 | 1/1898 | Schilling | 294—82 |
| 2,027,376 | 1/1936 | Grau | 294—82 |
| 2,514,307 | 7/1950 | Boyd | 294—82 |
| 2,600,538 | 6/1952 | Jackes et al. | 294—82 |
| 3,008,210 | 11/1961 | Stovern | 294—82 X |

EVON C. BLUNK, *Primary Examiner.*

SAMUEL F. COLEMAN, *Examiner.*

A. L. LEVINE, *Assistant Examiner.*